United States Patent [19]
Stein et al.

[11] Patent Number: 5,925,393
[45] Date of Patent: Jul. 20, 1999

[54] METHOD OF POPPING CORN

[75] Inventors: Andrew M. Stein, Floral Park; Andrew Jinks, Amityville; Robert Murphy, Lindenhurst, all of N.Y.

[73] Assignee: Six Corners Development, Inc., Amityville, N.Y.

[21] Appl. No.: 08/938,371

[22] Filed: Sep. 26, 1997

Related U.S. Application Data

[63] Continuation-in-part of application No. 08/728,363, Oct. 9, 1996, Pat. No. 5,771,779

[60] Provisional application No. 60/005,495, Oct. 16, 1995.

[51] Int. Cl.$^6$ ........................................................ A23L 1/00
[52] U.S. Cl. ............................ 426/233; 426/438; 426/450
[58] Field of Search .................... 426/231, 233, 426/438, 450, 523; 99/323.7, 323.9

[56] References Cited

U.S. PATENT DOCUMENTS

| | | | |
|---|---|---|---|
| 1,218,341 | 3/1917 | Truitt | 219/400 |
| 1,704,133 | 3/1929 | Le Claire | 99/323.8 |
| 1,786,877 | 12/1930 | Thompson | 99/323.9 |
| 1,977,831 | 10/1934 | Marshall et al. | 221/47.1 |
| 2,017,293 | 10/1935 | Priest | 53/4 |
| 2,027,698 | 1/1936 | Parks et al. | 53/4 |
| 2,034,484 | 3/1936 | Pagendarm | 194/48 |
| 2,230,460 | 2/1941 | Kleinwachter | 312/121 |
| 2,248,812 | 7/1941 | Cretors | 99/323.9 |
| 2,254,271 | 9/1941 | Cretors | 99/323.9 |
| 2,458,190 | 1/1949 | Newburger | 219/19 |
| 2,529,877 | 11/1950 | Ladge | 34/88 |
| 2,575,643 | 11/1951 | Tamsen | 34/225 |
| 2,646,189 | 7/1953 | Wickesberg | 222/36 |
| 2,743,633 | 5/1956 | Bruntjen | 99/323.9 |
| 2,859,015 | 11/1958 | Spangler | 257/2 |
| 2,907,264 | 10/1959 | Bushway | 99/323.7 |
| 2,939,379 | 6/1960 | Schmitt | 99/238.4 |
| 2,972,292 | 2/1961 | Waas et al. | 99/323.9 |
| 3,095,326 | 6/1963 | Green et al. | 118/11 |
| 3,197,076 | 7/1965 | Chamblee | 222/146 |
| 3,253,532 | 5/1966 | Jones | 99/238.3 |
| 3,321,107 | 5/1967 | Goven et al. | 222/2 |
| 3,554,115 | 1/1971 | Manley et al. | 99/323.7 |
| 3,645,422 | 2/1972 | Cretors | 222/169 |
| 3,783,820 | 1/1974 | Hautly | 118/19 |
| 3,812,774 | 5/1974 | Day et al. | 99/323.9 |
| 4,094,446 | 6/1978 | Brutsman | 222/146 HE |
| 4,171,066 | 10/1979 | Hirose | 221/150 A |
| 4,171,667 | 10/1979 | Miller et al. | 99/323.6 |
| 4,182,229 | 1/1980 | VandeWalker | 99/323.7 |
| 4,372,354 | 2/1983 | Moore | 141/361 |
| 4,397,874 | 8/1983 | Piotrowski | 426/450 |
| 4,426,923 | 1/1984 | Ohata | 99/468 |
| 4,477,003 | 10/1984 | Baker et al. | 222/642 |
| 4,632,275 | 12/1986 | Parks | 222/25 |
| 4,727,798 | 3/1988 | Nakamura | 99/323.5 |
| 4,850,120 | 7/1989 | Stein | 99/474 |
| 5,020,688 | 6/1991 | Power | 221/150 A |
| 5,033,363 | 7/1991 | King et al. | 99/323.7 |
| 5,035,173 | 7/1991 | Stein et al. | 99/323.7 |
| 5,555,792 | 9/1996 | Stein et al. | 99/323.9 |
| 5,771,779 | 6/1998 | Stein et al. | 99/323.7 |

*Primary Examiner*—George Yeung
*Attorney, Agent, or Firm*—Pennie & Edmonds LLP

[57] ABSTRACT

This invention discloses an automated corn popping apparatus including a kettle, a support arrangement for supporting and operating the kettle, a display arrangement for enclosing the corn popping apparatus, a controller for automatically operating the corn popping apparatus, and a conduit system for introducing cooking oil into the kettle. In a preferred embodiment, the kettle includes a kettle and an agitator mechanism. A support arrangement includes a mechanism for rotating the kettle from a position for popping corn to a position for dumping corn into the display arrangement. Also, a shaft mechanism is used for raising and lowering the lid and rotating the agitator mechanism. The shaft mechanism is in fluid association with a source of cooking oil at one end of its length, and has apertures located near the other end of its length so as to provide a conduit for the supply of cooking oil directly into the kettle. The controller includes actuators for necessary mechanical movement, sensors to determine component positions, and a programmer to receive sensor signals and control actuators to achieve automatic corn popping.

17 Claims, 10 Drawing Sheets

| # | OPERATION | OPERATION DESCRIPTION |
|---|---|---|
| 1 | LID-UP | ACTIVATE MOTOR 601 TO RAISE SHAFT 522 AND LID 520 UNTIL MICROSWITCH 532 SIGNALS THAT THE LID IS UP. |
| 2 | LID-DOWN | ACTIVATE MOTOR 601 TO LOWER SHAFT 522 AND LID 520 UNTIL MICROSWITCH 534 SIGNALS THAT THE LID IS DOWN. |
| 3 | KETTLE-FORWARD | ACTIVATE MOTOR 555 TO ROTATE KETTLE ASSEMBLY 509 FROM A DUMPING POSITION UNTIL MICROSWITCH 536 SIGNALS THAT THE KETTLE IS IN POPPING POSITION. |
| 4 | KETTLE-DUMP | ACTIVATE MOTOR 555 TO ROTATE KETTLE ASSEMBLY 509 FROM A POPPING POSITION UNTIL MICROSWITCH 535 SIGNALS THAT THE KETTLE IS IN DUMPING POSITION. |
| 5 | OIL-HEAT | ACTIVATE AN ASSOCIATED COOKING OIL RESERVOIR HEATER FOR A MEASURED TIME INTERVAL TO MELT A PORTION OF THE COOKING OIL. |
| 6 | OIL-DELIVERY | ACTIVATE AN ASSOCIATED COOKING OIL RESERVOIR PUMP FOR A PERIOD OF TIME SUFFICIENT TO DELIVER A PORTION OF THE COOKING OIL ADEQUATE FOR THE AMOUNT OF CORN PROVISIONED. |
| 6 | AGITATOR-CONTROL | START THE AGITATOR IF STOPPED BY ACTIVATING MOTOR 554 AND STOP THE AGITATOR IF STARTED BY DEACTIVATING MOTOR 554. |

FIG. 8C

| # | STEP | COMMENT |
|---|---|---|
| 1 | START | START WITH THE KETTLE IN A POPPING POSITION AND THE LID UP; PROVISION A MEASURED AMOUNT OF POPCORN. |
| 2 | AUTOMATIC POPPING SEQUENCE INITIATED | THE OPERATOR PRESSES AUTOMATIC CYCLE REQUEST SWITCH 905 TO INITIATE THE AUTOMATIC POPPING SEQUENCE OUTLINED BELOW IN STEPS 3-13. |
| 3 | LID-DOWN | LOWER LID 520 AND AGITATOR SHAFT 522. |
| 4 | OIL-HEAT | HEAT COOKING OIL IN AN ASSOCIATED COOKING OIL RESERVOIR. |
| 5 | OIL-DELIVERY/AGITATOR CONTROL | ACTIVATE AN ASSOCIATED COOKING OIL PUMP TO DELIVER A MEASURED AMOUNT OF COOKING OIL. (NOTE: THE AGITATOR SHAFT IS PREFERABLY ROTATING DURING THE PROVISIONING OF COOKING OIL.) |
| 6 | AGITATOR-CONTROL | ROTATE AGITATOR MECHANISM TO MIX CORN AND OIL AND ASSURE MAXIMUM POPPING. |
| 7 | TEMPERATURE CHECK | OPTIONAL STEP TO CHECK TEMPERATURE REPORTED BY CONTROLLER 806 AND CAUSE THE KETTLE TO REACH PROPER TEMPERATURE. |
| 8 | WAIT UNTIL POPPING SUBSTANTIALLY COMPLETE | SUBSTANTIAL COMPLETE POPPING IS SIGNALED BY MICROSWITCH 533 WHICH IS ACTIVATED BY LID 520 BEING URGED UPWARD BY THE VOLUME OF POPPED CORN. |
| 9 | DEACTIVATE TEMPERATURE CONTROL | OPTIONAL STEP TO ALLOW THE KETTLE TO COOL. |
| 10 | AGITATOR-CONTROL | TURN OFF THE AGITATOR MECHANISM. |
| 11 | LID-UP | RAISE THE LID AND THE AGITATOR SHAFT. |
| 12 | KETTLE-DUMP | DUMP THE POPPED CORN. |
| 13 | KETTLE-FORWARD | RETURN THE KETTLE TO POPPING POSITION IN PREPARATION FOR ANOTHER CYCLE. |

METHOD OF POPPING CORN

CROSS REFERENCE TO RELATED APPLICATIONS

This application is a continuation-in-part of application Ser. No. 08/728,363, filed Oct. 9, 1996, now U.S. Pat. No. 5,771,779, which claims the benefit of U.S. Provisional Application No. 60/005,495, filed Oct. 16, 1995.

FIELD OF THE INVENTION

The field of this invention relates to commercial popcorn poppers. More specifically it relates to efficient, reliable, and programmable corn popping assemblies and their enclosing support and display arrangements, control systems, and cooking oil conduit systems which are especially useful in movie theaters and other places of entertainment.

BACKGROUND

At movie theaters and other entertainment venues, such as stadiums and the like, the rapid and efficient dispensation of foods and beverages is required because consumers are usually purchasing such products during intermission or other temporary disruptions of the show or event that is being or to be viewed. A particularly popular food product to be consumed at such venues is popcorn, and fresh serving hot, tasty popcorn to a large number of consumers in a rapid and efficient manner presents a difficult problem for counter attendants. Often only one or two persons attend the counter while many more are present to be served.

One way to facilitate distribution of the product is to pop the corn and package it prior to the onset of the crowds, so that the packaged product can be rapidly dispensed when necessary. One problem here is that if done too early, the popcorn will not be as warm and tasty as freshly popped corn. In order to pop the corn, however, present commercial devices require the attendant to feed the corn, salt and oil into the kettle before each batch can be popped.

There are different types of kettle designs which are used. One type has the support structure below the base of the kettle. The bowl is generally held in the operative position by a return spring, and is emptied by the attendant's manipulation of a side handle. If the attendant is not careful, however, the pivoting return motion of the bowl can be so hard and fast as to bounce upon and damage its supports. A solution to this problem is described in U.S. Pat. No. 5,035,173.

Another design utilizes a ceiling mounting system for the kettle, with the handle and a spring lock positioned on the side of the housing. For either design, after the corn is fully popped, the attendant must move the handle to tilt the kettle to empty the popped corn therefrom. This diverts the attendant's time and effort to operation of the kettle for properly producing the product rather than serving the consumers.

Regardless of the design used, cooking oil needed for corn popping must be introduced into the popping bowl. Cooking oil distribution is a particular problem with prior devices. The oil is generally preheated to nearly popping temperature and then conventionally conducted through an inverted J-shaped tube and allowed to fall into the popping bowl. Since popping bowls generally must be covered to contain the energetically popping corn, an oil passage through the lid must be provided. This conventional design, involving hot oil falling towards a restricted passage through the popping bowl lid, first, exposes the hot oil to air. This is undesirable as it leads to various types of avoidable oil contamination. Second, if even slight misalignment of the oil tube and the oil passage in the lid occurs, hot oil will spill down the sides of the heated bowl. Since bowls are conventionally electrically heated, spilled oil may be a fire hazard. In any case, the hot oil will oxidize on the bowl to create an unsightly residue difficult to clean. Thus, such spillage is both a possible fire safety hazard and an immediate cleaning problem. Access to these surfaces for routine daily cleaning of these surfaces is difficult. Cleaning requires extra operator attention.

A fully automated system has been proposed in U.S. Pat. No. 5,035,173. While this system is satisfactory for many applications, the use of vacuum is noisy and the introduction of corn, salt, and oil into the kettle is not precise. Thus, there remains a need for an improved system for automating the production of popcorn and for providing cooking oil into the kettle.

SUMMARY OF THE INVENTION

It is a broad object of this invention to provide an integrated, efficient, reliable, safe, and programmable popcorn popping apparatus capable of automatic popping of tasty popcorn in commercial applications. Thereby, this invention includes a popcorn popping kettle assembly, a support arrangement for supporting and operating the kettle assembly for the popping of popcorn, a conduit system for efficiently and safely providing cooking oil to the kettle assembly, a display arrangement for the commercial display of the elements of this invention in operation and of the freshly popped corn, and control means for the automatic control of the mechanical and electrical elements of this invention.

The kettle assembly of this invention preferably provides for the mixing of corn and cooking oil so that the popcorn kernels become uniformly coated with cooking oil and subsequently provides for a uniform temperature suitable for popping the coated popcorn kernels. In a preferred embodiment, the kettle assembly includes a popping kettle, a base member, and an agitator mechanism. The kettle has a generally circular shape with a slightly sloping sidewall and a bottom, and is preferably made of cast or welded aluminum. The kettle includes a recess in the outer surface of the bottom for receiving heating means, which preferably are electric heating elements in thermal contact with the kettle. The heat provided is thereby distributed by conduction within the aluminum kettle for popping the popcorn at a substantially uniform temperature.

The base member provides for the support and pivoting of the kettle assembly. In a preferred embodiment it includes dependent legs each of which accepts a pivot shaft about which the kettle assembly pivots from a popping position, which is substantially upright, to a dumping position, which is preferably substantially upside down. The kettle is spaced away from the base to define an open space for the passage of electric wires carrying power to the heating elements and signals from temperature sensing means, which are also attached to the bottom of the kettle. These feeds are routed from this space to the exterior of the kettle assembly through a hollow pivot axle, which communicates with a hollow bore in one of the dependent legs, which in turn communicates with the space between the base and the kettle. In this manner, pivoting of the kettle assembly causes minimal motion of electric wires, which necessarily carry high current to the heating elements and are thereby prone to damage.

The kettle assembly further includes an agitator mechanism in the bottom of the popping kettle for mixing the corn kernels with the cooking oil and for insuring even popping of the popcorn. The agitator includes a hub supporting a plurality of agitator members. The hub is rotated by an agitator shaft, which enters the kettle from above to engage the hub for axial rotation. The agitator members can have any convenient configuration. The interior of the popping kettle and the agitator mechanism are coated with a non-sticking material such as Teflon™ or nickel-Teflon™ for easy cleaning.

The kettle assembly advantageously includes a material for insulating the sidewall of the popping kettle. The insulating material is generally placed between the kettle sidewall and an outer sheath, which is used to protect and retain the insulating material in position. The preferred insulating material is a ceramic sheet or blanket, and the preferred sheath material is a sheet of steel or aluminum. Thus the outer surface of the kettle assembly is significantly cooler than the temperature of the kettle; heat is uniformly distributed in the popping kettle; and cooking efficiency is improved.

The support arrangement for the kettle assembly preferably provides for the support and control of the pivoting of the kettle assembly; for a kettle lid which can be raised from the kettle for entry of unpopped corn kernels and removal of popped corn; and for rotation of the agitator mechanism by an agitator shaft. Electric motors and power transmission means effect the necessary mechanical movements, and position sensing means provide feedback for the control of these motors.

In a preferred embodiment, the kettle is pivoted by an electric motor coupled to one pivot shaft of the kettle assembly through a worm gear transmission and a sprocket and chain drive. The correct popping and dumping positions of the kettle are sensed by angular position indicators. In the preferred, but not limiting embodiment, these indicators are microswitches actuated by cams.

In a further preferred embodiment, the agitator shaft is mounted above the kettle for axial rotation and can be lowered into the kettle whereupon it contacts and engages the hub of the agitator mechanism. Axial rotation of the agitator shaft is driven by a motor and gear assembly, which is coupled to the agitator shaft by two gears which are engaged when the agitator shaft is lowered into the kettle.

Advantageously, in this preferred embodiment, the agitator shaft provides a means for injecting the cooking oil into the kettle. The cooking oil is pumped from an associated cooking oil container and pump system into the top of the agitator shaft, through a hollow inner portion of the agitator shaft, and sprayed into the kettle assembly through at least one aperture in the lower portion of the agitator shaft so as to evenly coat the kernels with cooking oil.

A kettle lid, preferably of a circular sheet of stainless steel or aluminum, is mounted on the agitator shaft for relative vertical movement along the shaft and relative axial rotation to the shaft. It is retained by a retaining washer at a lowest vertical position. Thereby, the lid can be raised by the vertical motion of the agitator shaft sufficiently to permit entry and exit of popcorn and to permit free pivoting of the kettle assembly. Further, the lid can be lowered into contact with the kettle for retaining heat during popping of the popcorn. Additionally, the expanding bulk of the popping popcorn can freely urge the lid upward. Also, when the lid is otherwise supported by the wall of the kettle, the agitator shaft can rotate freely to drive the agitator mechanism.

The vertical movements of the lid are sensed by vertical position sensors. In the preferred embodiment these sensors are microswitches contacted by the lid during its vertical movements. These microswitches are placed at a plurality of vertical positions, including at a first vertical position such that when the lid is positioned at this first position sufficient vertical height is available for the free pivoting of the kettle, a second vertical position such that at this second position the lid is in contact with the kettle assembly and the agitator shaft engages the agitator hub, and a third intermediate vertical position to which the lid is urged by the expanded bulk of a substantially completely popped provision of popcorn. In this manner feedback signals are generated for control of the vertical motion of the lid of the kettle and for sequencing of the popcorn popping cycle.

In the preferred embodiment, the agitator shaft is vertically raised and lowered as well as axially rotated. This is accomplished by forming circular grooves in the rod for engaging a gear. These teeth must not form a spiral, or thread, in order to prevent vertical motion from occurring when the shaft is axially rotated for driving of the agitator mechanism. The gear engaging the rod is driven by a motor and gear transmission system.

Thus, another aspect of the invention relates to a mechanism for imparting reciprocating linear motion and rotation, which comprises: an elongated shaft having a gear mounted thereon and a plurality of spaced grooves along its length; a first gear having a plurality of teeth of predetermined pitch which engage the grooves of the shaft, wherein clockwise rotation of the first gear causes longitudinal motion of the shaft in a first direction, while counterclockwise rotation of the first gear causes longitudinal motion of the shaft in a second direction opposite to the first direction, and a second gear mounted adjacent the shaft and capable of engaging the shaft gear for rotation of the shaft, wherein clockwise rotation of the second gear causes rotation of the shaft in a counterclockwise direction, while counterclockwise rotation of the second gear causes rotation of the shaft in a clockwise direction. The linear movement of the shaft causes the shaft gear to be moved from a first position where it engages the second gear so that the shaft can be rotated to a second position out of engagement with the second gear. The first and second gears are preferably driven by motor means which are actuated by position sensors. Advantageously, the shaft is operatively associated with the lid of a popcorn kettle for raising and lowering the lid during a popcorn popping cycle and one end of the shaft engages an agitator mechanism in the kettle when the gears are in the first position to rotate the agitator during rotation of the shaft.

The control means provides for control of kettle temperature and for control of the mechanical movements of the kettle assembly and support arrangement. Temperature control means include means for sensing popping kettle temperature placed in good thermal communication with the kettle. In a preferred version, these sensing means include a thermocouple. A temperature controller accepts signals from the sensing means and energizes or de-energizes the heating elements to maintain an adjustable preset temperature. Preferably the heating elements are activated through a relay adapted for repetitive high current applications, such as a mercury or electronic relay. The temperature control means further include an independent temperature sensing means, also in good thermal contact with the popping kettle, which is set to open a control circuit at the maximum safe operating temperature, and thereby to prevent the kettle from reaching dangerous temperatures. In this manner an adjustable temperature may be accurately and safely maintained, and corn popping conditions adjusted for maximum efficiency and flavor.

The mechanical control means accepts both operator requests and signals from the various position sensing means and outputs signals for actuating the various motors of the support arrangement. These means also accept signals representing the substantially complete popping of a provision of popcorn. In the preferred embodiment, such a complete popping signal is generated by the kettle lid being urged upward by the expanding bulk of popping corn contained in the kettle. This invention is adaptable to any alternative means to generate a complete popping signal, such as optical detection of the expanding popping popcorn. Optionally, these control means can accept and output signals to the temperature control means for providing overall control of all elements of the popcorn popping apparatus. In a preferred embodiment, the mechanical control means include both a programmable logic controller and associated circuits for controlling motor power and an operator control panel with request buttons and monitoring lights. Alternative embodiments are equally applicable to this invention, one such being a standard microprocessor controller with associated RAM, ROM, and interface circuits and with a keypad and an LCD type display panel for operator interaction.

The mechanical control means are programmed to recognize requests for certain elementary mechanical operations of the support arrangement. In an preferred embodiment, these elementary operations comprise rotating the kettle to a popping or a dumping position, raising or lowering the kettle lid, rotating the agitator shaft, and controlling an associated cooking oil delivery system. These operations may be requested by means of control panel buttons, and their progress monitored by means of panel indicators. In a manual mode of operation, these elementary operations must be individually selected by the operator. In an automatic mode of operation, the logic controller automatically sequences these elementary operations to achieve substantially complete popping of a popcorn provision. For improved security, these modes are selected by a key lock, whereby an unskilled operator is prevented from perhaps operating the apparatus in a dangerous or destructive manner.

The display arrangement of this invention provides for the attractive display of the apparatus, for storage of already popped corn, and for the protection of various mechanical elements and consumable supplies. This arrangement comprises an upper compartment, a display compartment, a middle compartment, and an optional lower compartment for support. The upper compartment houses various mechanical elements of the support arrangement. The display compartment provides for the attractive display of the kettle assembly and already popped corn. The middle compartment also houses air circulation and warming means whereby warm air can be recirculated through the display compartment to maintain the already popped corn in a warm and tasty condition. In a preferred embodiment, the middle compartment houses the control means. The optional lower compartment can house an associated cooking oil reservoir and delivery system and supplies of popcorn premixed with salt. In one embodiment, the popcorn, which may be premixed with salt, sugar, or other flavoring, is manually provisioned into the cooking kettle. In an alternative embodiment, automatic means can provision the popcorn into the kettle.

The display arrangement can have numerous specific embodiments, each being directed to a particular commercial application. These applications include, for example, use in movie theaters or other places of entertainment in an area accessible to the public in which attractive display and decoration are important, or use in kitchen environment of such an establishment in which only functional display is important. Further, the various elements of the apparatus may be arranged in different manners as may be convenient. For example, the middle compartment can be eliminated and the warm air circulation and control means housed in the upper compartment.

BRIEF DESCRIPTION OF THE DRAWINGS

These and other features, aspects, and advantages of the present invention will become better understood by reference to the accompanying drawings, following description, and appended claims, where:

DETAILED DESCRIPTION OF THE PREFERRED EMBODIMENT

For clarity of disclosure, and not by way of limitation, the detailed description of this invention is described with respect to an exemplary embodiment. However, it is apparent to those skilled in the relevant arts that related arrangements and embodiments of the components disclosed can be used to construct other embodiments of this invention that achieve equivalent efficiency, reliability, and programmable operation and that are within the scope of the claims.

The principal elements of the invention are now described in detail beginning with the display arrangement, then the kettle assembly, followed by the support arrangement, and concluding with the control means.

A. THE DISPLAY ARRANGEMENT

Figure 1:
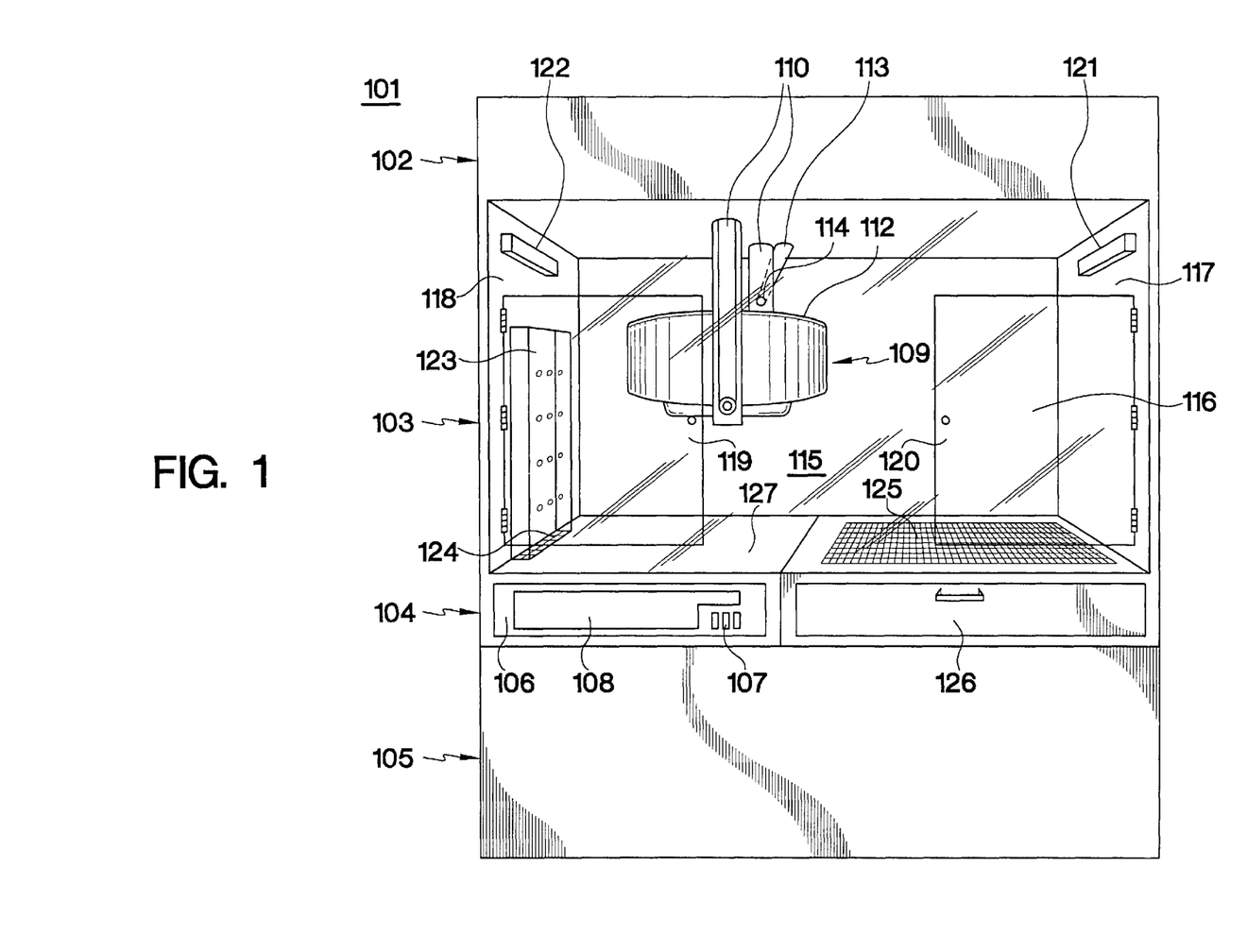
FIG. 1 illustrates the overall corn popping kettle assembly and the support and display arrangements.

FIG. 1 illustrates exemplary embodiment 101 of the kettle assembly, support arrangement, and display arrangement of this invention. The display arrangement comprises four compartments: upper compartment 102 houses portions of the support arrangement and provides passage for such cooking oil, electrical signals and power, and popping corn as are necessary to supply the kettle assembly for popping corn. Lower compartment 105 stores reservoirs of consumable materials, such as popping corn and cooking oil. Such storage is illustrated in U.S. Pat. No. 5,035,173 ("the '173 patent"), which is herein incorporated in its entirety by reference. As therein shown, cooking oil can be stored in conventional containers supplied with electrical heating elements. The '173 patent also discloses a pump which is operatively associated with the cooking oil container to provide pressure such that the cooking oil sprays into the kettle so as to evenly coat the kernels. Also, the bag-in-the-box arrangement of U.S. Pat. No. 5,301,601 can be used. Corn can be stored in bins and provided to the kettle assembly by vacuum or air pressure feed methods. Compartment 105 also serves for access to building power supplies. In an alternative embodiment, the apparatus of this invention can be adapted to rest on a table or other support with lower compartment 105 absent.

Middle compartment 104 provides support for control panel 106. Switches 107 control display arrangement functioning, such as display compartment 103 lighting and cooking oil heating. Portion 108 of the control panel is for control of the kettle assembly and is described below with reference to FIG. 8.

Display compartment 103 houses kettle assembly 109, which is supported by side braces 110 of the partially illustrated support arrangement. Corn funnel and conduit 113 transport popping corn through opening 114 into the kettle when lid 112 is lifted off the kettle. Corn conduit 113 is herein illustrated for an automatic arrangement for the provisioning of corn into the kettle whereby the corn is transported from a reservoir in compartment 105, mixed with salt, and provided in measured portions into the kettle. However, in a preferred embodiment for manual corn provision, an operator would simply pour corn kernels into corn conduit and funnel 113.

Display compartment has four vertical panels: 115, 116, 117, and 118. As herein illustrated, panels 115 and 117 are of an opaque rigid material, such as a high quality plywood or a wood/plastic laminate. Side panel 118 may be of a transparent material such as glass, safety/laminated glass, acrylic or plexiglass. Front panel 117 may be of the same material as the sides, with plexiglass preferred for the hinged access doors 119 and 120. It is understood that the construction of these panels is exemplary only. In a free standing application, where customers approach from all sides, panels 115, 117 and 118 can be glass and front panel 116 can be plexiglass. Alternatively, in a recessed application, all but face panel 116 can be of less expensive opaque construction, such as plywood. In a further alternative, the doors illustrated can be replaced by one door, by three doors, by left handed doors, by sliding doors, and so forth, as may be demanded in a particular application. In addition, the lower portion of the compartment can have a pull-down drawer for access to the bottom of the compartment where the popped corn is retained for access thereto.

Lighting elements 121 and 122 provide low voltage interior light to display kettle operation and available popcorn. These are exemplary only, and alternatively any suitable attractive or decorative lighting arrangement can be provided. Also depending on the application, it is understood that the exposed faces of the display arrangement can be provided with such decoration, labeling and illumination as are suitable for such devices.

Affixed to side panel 118 is chimney 123 provided with a plurality of perforations for the passage of air. Air is drawn through these perforations in chimney 123, down into middle compartment 104 through opening 124 in panel 127. The air is heated in the middle compartment and passes through screen 125 to heat the popped popcorn contained in display compartment 103. As here illustrated, chimney 123 is made of a transparent material such as plexiglass to allow visual observation of the interior of the compartment. Alternatively, chimney 123 may be of opaque materials such as sheet metal, when visual access is not desired or needed.

Advantageously, chimney 123 is easily removable for cleaning. Screen 125 has a mesh size which is sufficiently fine to prevent the majority of popped corn from passing through, but sufficiently coarse to permit unpopped corn kernel to pass through and be collected for removal from the compartment. Furthermore, excess cooking oil and other waste material can pass through screen 125. These undesired materials accumulate in the right half of the middle compartment, in drawer 126, and can be easily removed by removing and cleaning this drawer.

The construction of the display arrangement is by any means known in the art. It is preferable that the framework be of welded or bolted metal elements of sufficient rigidity and strength that the kettle assembly may be operated without causing perceptible vibration or shaking.

Figure 2:
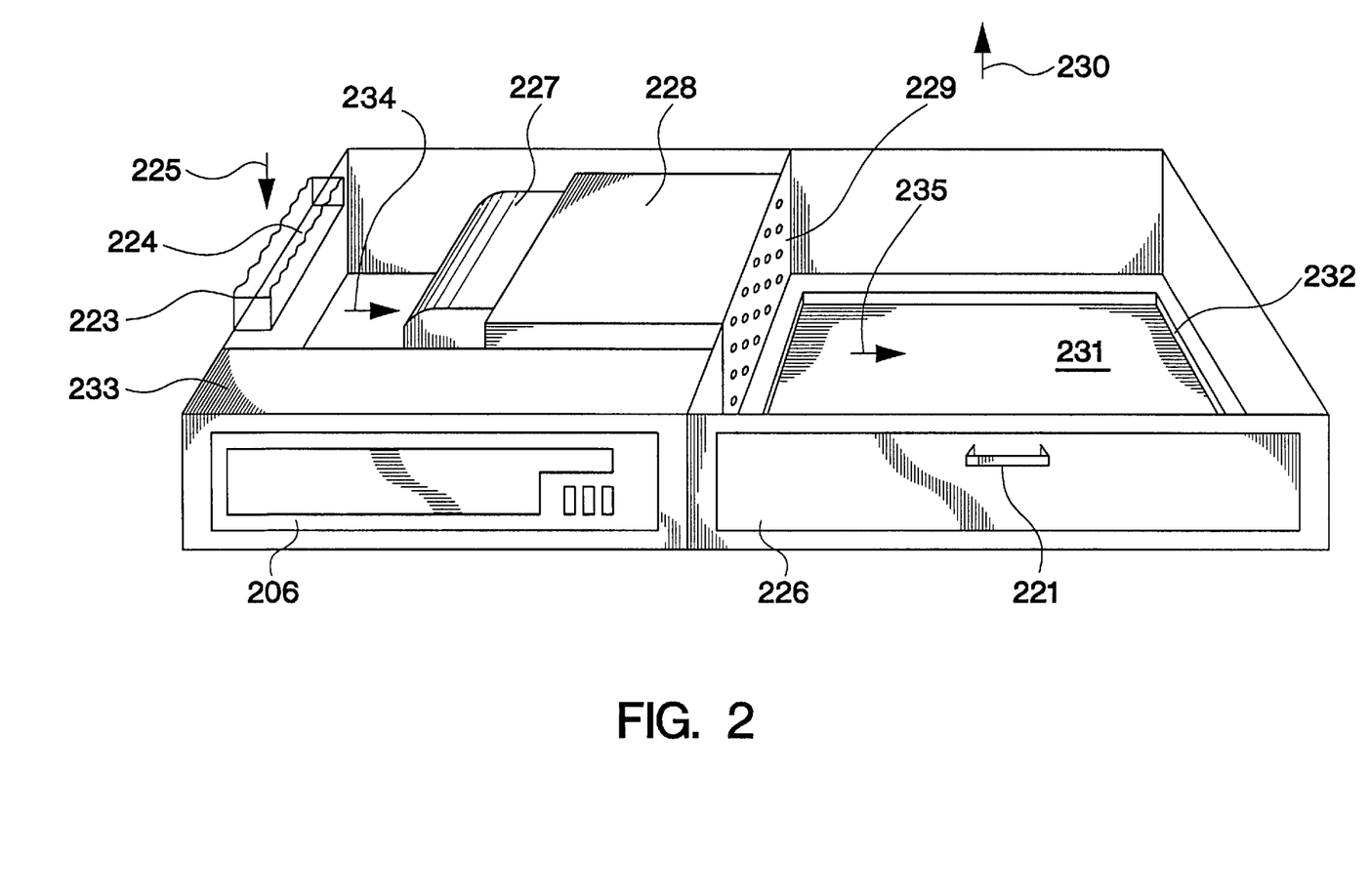
FIG. 2 illustrates a compartment of the display arrangement of the apparatus of FIG. 1.

FIG. 2 illustrates in more detail middle compartment 104 of the display arrangement of this invention. Panel 127 and screen 125 are removed. Chimney 223 has opening 224 for the passage of air downward in direction 225 from display compartment 103. This air is drawn in direction 226 by electric blower 227 and forced through compartment 228. This compartment contains a conventional electric heating element for warming the air. The air passes out of compartment 228 in direction 229 through perforations in face 229, and then through screen 125 into the display compartment in direction 230.

Drawer 226, comprising front surface with a handle 221 and a tray 231 having low sides 232, is for collecting and removing unpopped popcorn, waste oil, and other unwanted materials. The low sides 232 present a minimal obstruction to the flow of warmed air through the drawer. Compartment 233 contains the electrical controls of this invention and is fronted with control panel 206.

The middle compartment is preferably constructed of non metalic stainless steel. Alternatively materials of equivalent strength and heat resistance can be used.

B. THE KETTLE ASSEMBLY

Figure 3A:
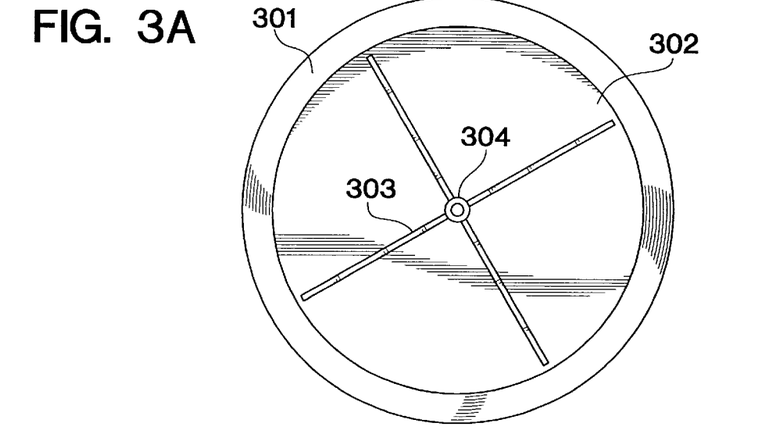
FIGS. 3A, 3B, and 3C illustrate three views of the kettle assembly the apparatus of FIG. 1.
Figure 3B:
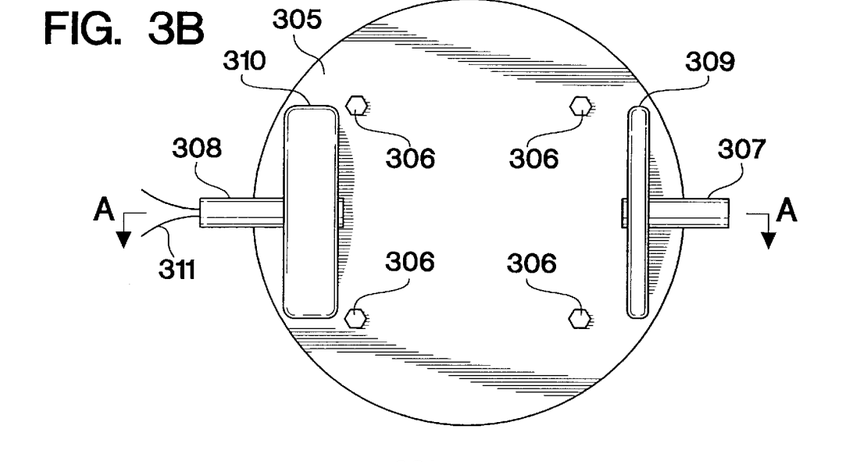
Figure 3C:
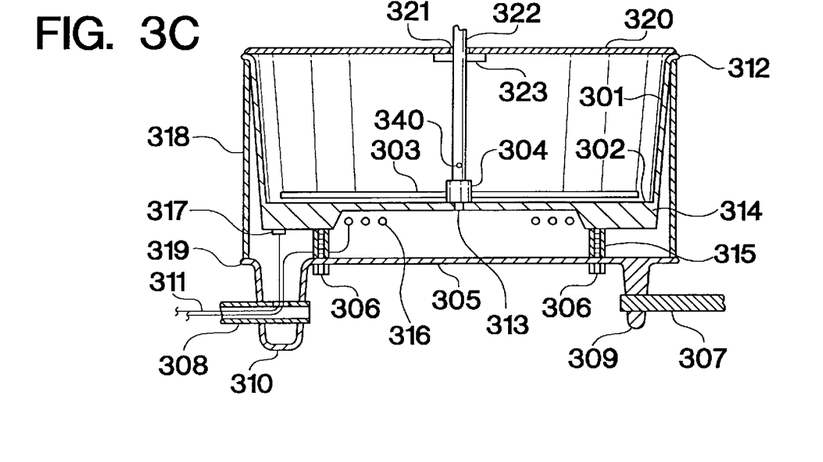

FIGS. 3A, 3B, and 3C illustrate in more detail kettle assembly 109 of FIG. 1. FIG. 3A illustrates a top view of the kettle assembly showing the inside of the kettle with slightly inwardly sloping walls 301 and base 302. The entire inner surface of the kettle is coated with a non-stick heat resistant material such as Teflon™ or nickel-Teflon™ for easy cleaning. Also shown is an agitator assembly for mixing the corn with the cooking oil prior to popping to assure thorough coverage of the popcorn with the cooking oil and for agitating the corn during popping to insure as complete popping as possible. The agitator assembly, in an exemplary embodiment, comprises agitator arms 303 connected to coupler hub 304. These agitator components are preferably made of stainless steel and are connected by welding, although alternative metals and connections are possible. Alternative embodiments can comprise either more or fewer arms of bent or other non-straight configurations. The primary function of the agitator is to assure mixing of the corn and oil across the entire bottom surface of the bowl, with the particular orientation of the arms being sufficiently sized, configured and arranged to achieve this function.

FIG. 3B illustrates a bottom view of the kettle assembly. Base 305 is attached to the kettle by bolts 306. The kettle assembly is supported by first pivot shaft 307 and by second pivot shaft 308. The first and second pivot shafts are coaxial so that the kettle assembly may be pivoted between an operating, or corn popping, and an emptying, or corn dumping, position. The pivot shafts are attached to base 305 by first leg 309 and second leg 310. Leg 310 and pivot shaft 308 are hollow and provide a means for electrical wires 311 to access the base of the kettle.

FIG. 3C illustrates a median cross section of the kettle assembly showing details of its construction. This kettle assembly is similar to that disclosed in applicants' copending U.S. patent application Ser. No. 08/328,325, now U.S. Pat. No. 5,555,792, which is herein incorporated by reference in its entirety. The kettle comprises slightly sloping side 301 with curved-over lip 312, substantially flat base 302, and thickened perimeter 314 under the base into which are screwed attaching bolts 306. Inside the kettle, the agitator mechanism comprises arms 303 and coupling hub 304. The coupling hub rotates on stub axle 313, which is fixedly attached to or through the middle of kettle base 302. Attached underneath the base of the kettle are electric heating means 316 and temperature sensing means 317. Preferably, the electric heating means is a conventional electrically resistive heating element and the temperature sensing means comprises a temperature sensing thermocouple and a bimetallic high temperature switch. The bimetallic high temperature switch is chosen to open above the maximum safe operating temperature of the kettle, which is approximately 450° F. Wires 311 provide electric power to the heating element and conduct temperature signals from the temperature sensing means. The kettle is constructed of heat conductive material of sufficient thickness that heat is evenly distributed throughout its interior for the even and complete popping of contained popcorn. Preferably the kettle is constructed of cast aluminum of a thickness no less than approximately 0.25 inches. Welded aluminum, steel or stainless steel sheet can also be used to form the kettle.

The kettle assembly is supported for pivoting by coaxial pivot shafts 307 and 308 fixedly connected to legs 309 and 310, respectively. The legs are an integral part of base 305. Pivot shaft 308 and leg 310 are hollow and pivot shaft has a slot to permit access as shown of wires 311 to the components attached underneath the kettle. The base and the kettle, joined by attaching bolts 306, are separated by spacer sleeves 315 surrounding the attaching bolts at a distance sufficient to permit easy access of electrical wires 311 to components 316 and 317. The base is preferably of a cast metal, such as steel, stainless steel or aluminum.

Another component of the kettle assembly is sheath 318. Sheath 318 is pressure fit to the perimeter of the base, as at 319, and slightly compressed under kettle lip 312. Alternatively, the sheath can be fixed to the base with machine screws. Optionally, insulation can be placed in the space between sheath 318 and the outer surface of the side of the kettle in order to conserve heat and thereby minimize the use of electric power for heating and to lower the exterior surface temperature of the kettle assembly for safety of operators of this invention. In particular, a fiber glass blanket may be used between the wall of the kettle and the sheath 318 to prevent heat loss, discoloration, and skin burns. The sheath is preferably of sheet metal and most preferably of stainless steel sheet. Such sheet can be polished to present an attractive exterior surface for the kettle assembly.

The kettle attachment to base 305 permits easy kettle removal upon removal of bolts 306. Preferably, wires 311 have enough excess length so that the kettle may then be entirely lifted out of the base and sheath assembly. Easy removal of the kettle is important as the electric heating means and the temperature sensing means can require occasional repair or replacement because they are exposed to high heat and conduct high currents.

Also shown in FIG. 3C are associated components of the supporting arrangement. Lid 320 is mounted on agitator shaft 322 at hole 321 for easy vertical displacements along shaft 322. When a provision of popcorn is just loaded, lid 320 rests evenly on kettle lip 312 for retaining heat in the kettle. However, as the popcorn pops and its volume expands, lid 320 is urged upward along agitator shaft 322. The lid is preferably balanced with a center of gravity in hole 321 so such vertical displacements are effected with a minimum of force. The lid is preferably constructed of metal sheet, and most preferably of a rigid aluminum or stainless steel.

Agitator shaft 322 is mounted in the supporting arrangement for vertical motion. When agitator shaft 322 is displaced vertically, retaining ring 323, which is fixedly attached to shaft 322, also lifts lid 320. Agitator shaft 322 is also mounted for axial rotation, which is coupled through coupling hub 304 to the agitator mechanism. Hole 321 in lid 320 is of a size just sufficient to permit unimpeded vertical displacement along agitator shaft 322 as well as unimpeded axial rotation of agitator shaft 322.

Advantageously, cooking oil is dispensed into the kettle through apertures 340 located on the lower portion of agitator shaft 322. In a preferred embodiment, the agitator shaft has two apertures 340 evenly spaced around the circumference of the shaft. However, one, or more than two apertures may also be utilized. The cooking oil is pumped from containers in the lower compartment (105 of FIG. 1) of the popping apparatus, as described in the '173 patent incorporated by reference, to an opening at the top of agitator shaft 322. In the preferred embodiment, the oil then flows down a hollow inner portion of agitator shaft 322 under sufficient pressure so as to spray through apertures 340. In this manner, the kernels are evenly coated with the cooking oil.

Figure 4A:
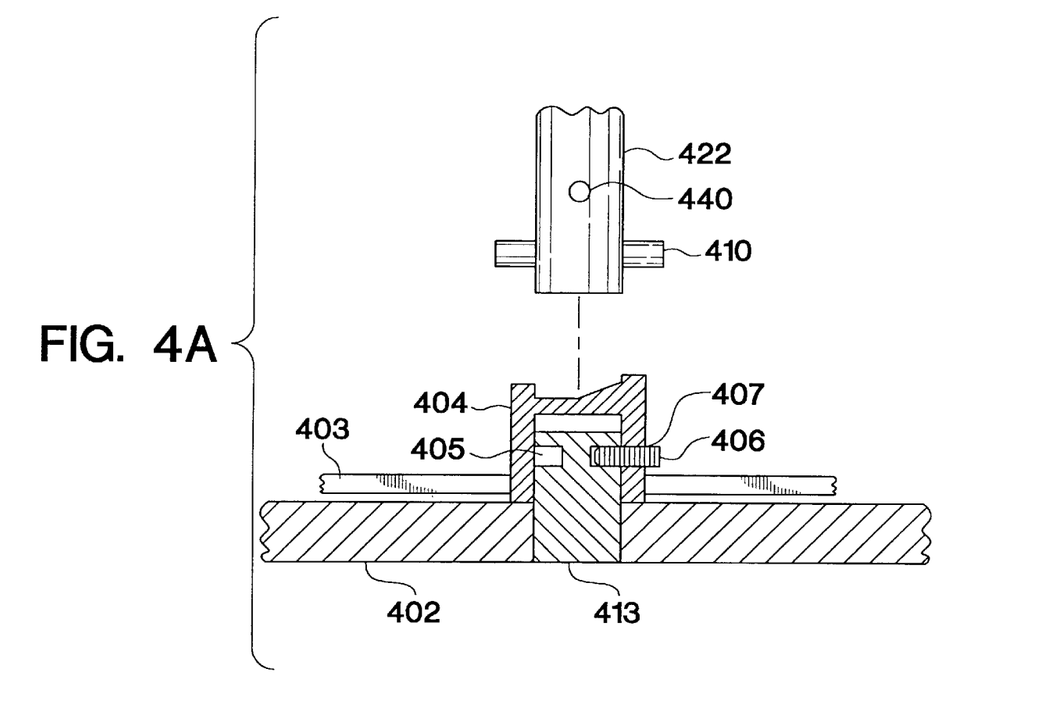
FIGS. 4A and 4B illustrate two views of the agitator shaft coupling of the kettle assembly the apparatus of FIG. 3C.
Figure 4B:
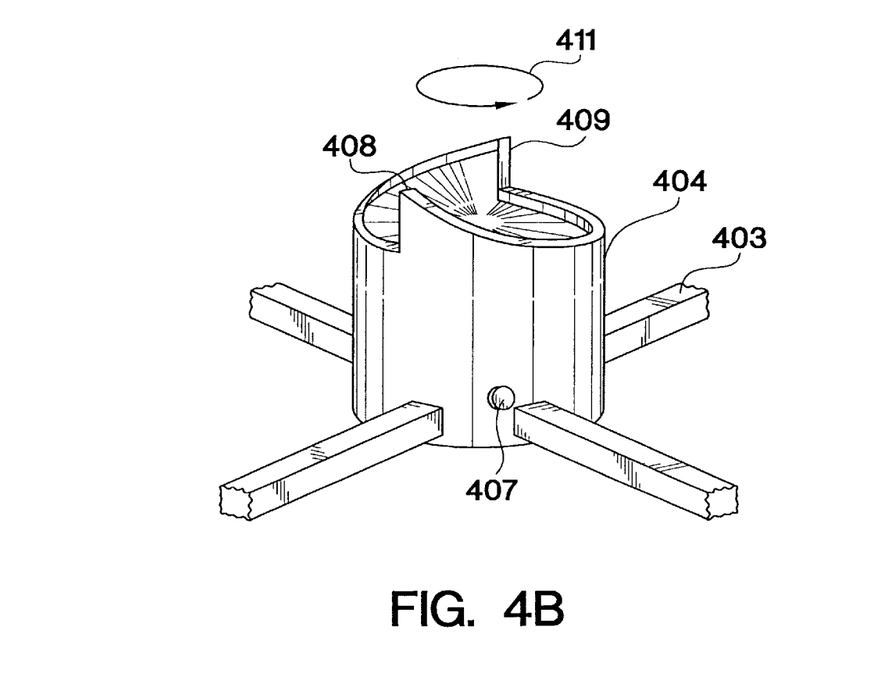

FIGS. 4A and 4B illustrate details of the bottom of agitator shaft 422, coupling hub 404, and stub axle 413. Coupling hub 404 fits over stub axle 413 for free axial rotation. Stub axle 413, fixedly mounted on or through kettle base 413, has circular slot 405 near its upper end. Slot 405 freely accommodates pin 406, which is fixedly but removably mounted in coupling hub 404 through hole 407. In this manner, with pin 406 in place, coupling hub both freely rotates on stub axle 413 and remains in place when the kettle assembly is pivoted for dumping of popped corn. When pin 406 is removed, the coupling hub can be removed from the stub axle for cleaning or repair.

Coupling hub has an inclined upper perimeter culminating in teeth 409 and 410. These teeth engage with pin 410 which if fixedly inserted through agitator shaft 422 for rotation in the direction indicated at 411. This sloping but toothed configuration permits easy engagement of coupling hub 404 with agitator shaft 422 when the shaft is lowered to contact the hub regardless of the angular orientation of pin 401. This configuration is superior to a configuration in which the upper surface of hub 404 is simply slotted. A slotted configuration requires exact alignment of such a slot with pin 410 in order to ensure positive engagement of the shaft and the hub.

Also shown is aperture 440 for delivering cooking oil into the kettle. As discussed above, the shaft preferably has two apertures 440 evenly spaced around the circumference of the shaft 422. Each aperture has a diameter which is smaller than that of unpopped kernels so that the unpopped kernels do not become lodged in the aperture to block the flow of oil. Aperture diameters of between ⅛" and ¼" prevent a normal-sized unpopped corn kernel from becoming lodged. However, in a preferred embodiment, the diameter of each aperture is no larger than approximately 3/16".

C. THE SUPPORT ARRANGEMENT AND OIL CONDUIT SYSTEM

Figure 5:
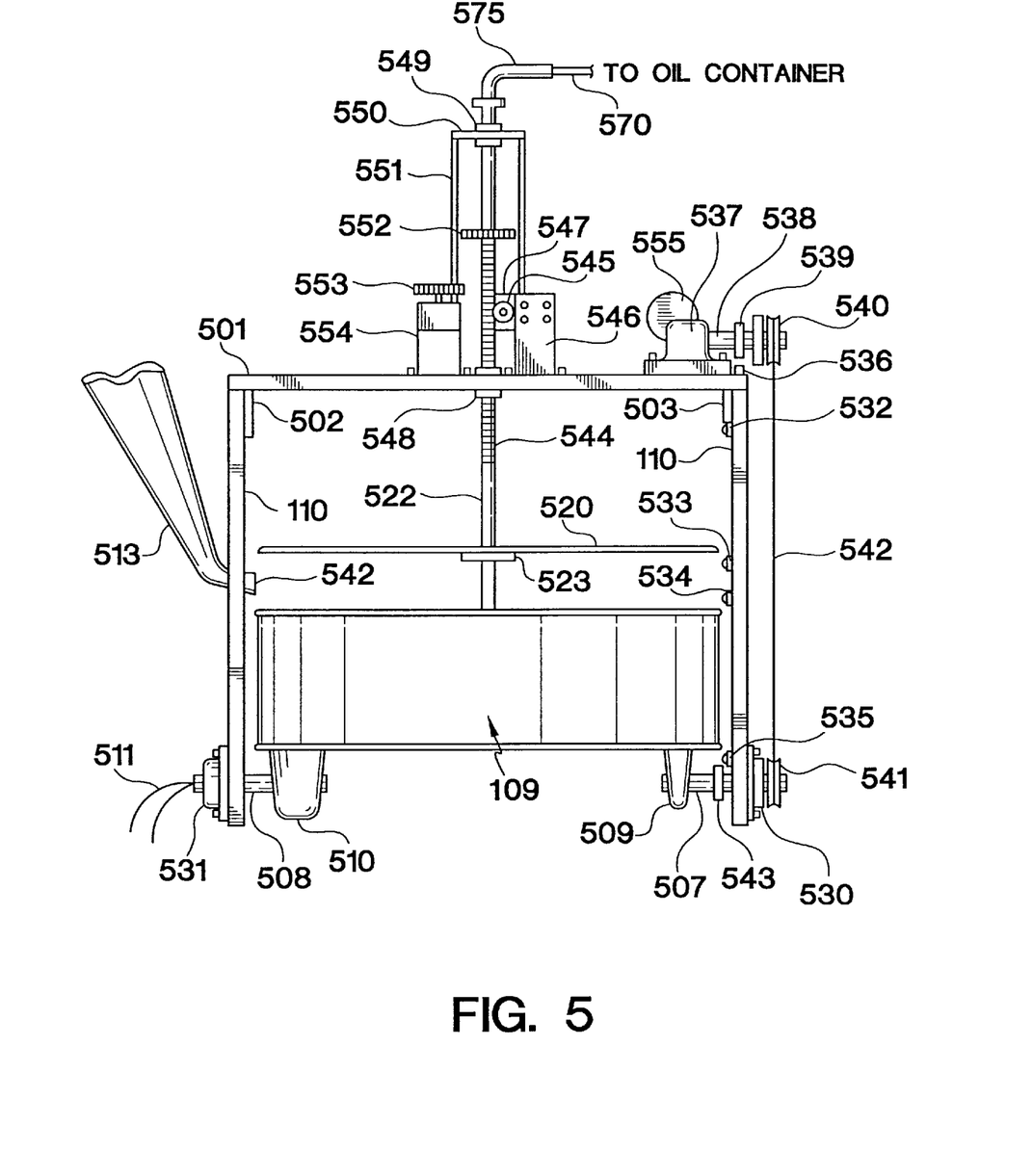
FIG. 5 illustrates a longitudinal view of the support arrangement and apparatus of FIG. 1 and the oil conduit system of the popping apparatus.

FIG. 5 illustrates a side view, with respect to the orientation illustrated in FIG. 1, of the support arrangement of this invention and the oil conduit system of the popping apparatus. In an exemplary embodiment, the physical structure of the support arrangement comprises horizontal cross member 501 to which are attached vertical brace members 510 and 511. This physical structure is supported by horizontal members 502 and 503 which are anchored to the physical structure of the display arrangement of FIG. 1. Kettle assembly 509 is attached to this structure by coaxial pivot shafts 507 and 508 which are rotatably attached to the brace members by journals 530 and 531. These journals must be of sufficient strength and reliability to permit numerous cycles of rotation of the heavy kettle assembly, and preferably contain support bearings. Support bushings are less preferable. Wires 511 supply power to the electrical heating means carry temperature signals from the temperature sensing means in the kettle assembly. These wires pass through hollow pivot shaft 508 and hollow leg member 510.

The operating steps of the invention are now described. Operation of the invention is divided into popping cycles. A cycle begins with the kettle positioned in the substantially upright position as illustrated in FIG. 5 and kettle lid 520 lifted substantially to the position of microswitch 532. FIG. 5 illustrates the kettle lid in a partially lifted position. When the unit is first turned on each day, the kettle is initially heated to the desired corn popping temperature of about 430° F. A temperature controller (described in greater detail below) is used to control the heating element so that the bowl is maintained at the desired popping temperature for the remaining cycles of operation of the device.

After the desired temperature is initially achieved, corn is then provisioned into the heated kettle. Popcorn, which may be premixed with salt or other flavorings, is placed into the entry of funnel 513, whereupon gravity propels the popcorn kernels with sufficient velocity that they enter the kettle with essentially no spillage. Corn can be placed in the funnel entry either by manual means or by automatic means, as disclosed in U.S. Patent 5,035,173.

Next kettle lid 520 is lowered into contact with the kettle, and cooking oil is provisioned into the kettle through the apertures of agitator shaft 522. In the preferred embodiment, cooking oil may not be provisioned into the kettle until sensor 536 signals that the kettle is in its popping position, and sensor 534 signals that the lid is in contact with the kettle.

FIG. 5 shows tube 570 and swivel attachment 575 for providing a fluid conduit between the oil container located in the lower compartment of the popping apparatus and the agitator shaft 522. Tube 570 extends from the oil container to attachment 575 and is preferably of a flexible, heat-resistant Teflon™ material. Swivel attachment 575 is fluidly connected to tube 570 and the agitator shaft 522. Advantageously, swivel attachment 575 allows the agitator shaft to rotate while still dispensing the cooking oil. The swivel attachment is preferably made of stainless steel. Of course, any suitable apparatus may be utilized to provide a fluid conduit between the oil container and agitator shaft 522.

The amount of cooking oil injected into the kettle is chosen in accord with the amount of corn so that all provisioned popcorn kernels have a uniform layer of cooking oil upon agitation. Preferably, the agitator shaft is rotated while the appropriate amount of oil is sprayed onto the kernels. However, oil may be injected while the agitator shaft is stationary.

The corn and oil are then brought up to popping temperature. Large temperature adjustments are not usually necessary since the kettle remains substantially at popping temperature from a previous cycle. However, the oil is manually adjustable as is the oil heat via timers located on the control panel. As the corn pops, the expanding volume of the popped corn, first, reaches the top of the kettle and then expands above the kettle. This expanding volume of popped corn urges the kettle lid upward eventually reaching the position of an actuating microswitch 533. This actuation is a signal that the corn popping is substantially complete. Thus, the position of the microswitch must be chosen in accord with the amount of corn provisioned into the kettle so that the volume under the kettle lid when the lid is at the position of microswitch 533 represents substantially complete popping of the provisioned corn. In a preferred embodiment, the position of microswitch 533 is approximately 2 to 2.5 inches above the top of the kettle. In alternative embodiments, one of ordinary skill in the art can adjust the position of the microswitch 533 according to the amount of popcorn to be provisioned. Also, in a less preferred embodiment, sensor 534 and the programmable control means can be configured such that sensor 534 signals when the lid is urged upward by the popping corn. The programmable control means, responsive to this signal, would then delay for a suitable period of time to allow the popping corn to substantially complete popping before further raising the lid. In this manner, the need for microswitch 533 is eliminated.

When the lid position signals substantially complete popping of the provisioned popcorn, the lid is then further raised to the position of microswitch 532. After a time period sufficient to allow the corn to fully complete popping, the kettle is then rotated to a position in which the popped corn is dumped from the kettle into the display compartment of the display arrangement.

Rotation from a popping position to a dumping position requires sufficient clearance between agitator shaft 522 and kettle lid 520 in their fully raised position and the top of the kettle assembly in order to avoid any mechanical interference. This required clearance determines the required vertical motion of the agitator shaft and kettle lid and, thereby, the length of side braces 510 and 511. In the preferred embodiment, the kettle assembly may not rotate to its dumping position until microswitch 532 signals that the kettle lid is raised up to the position of microswitch 532.

In a preferred embodiment the popped corn is dumped between 25 and 35 seconds after the lid is raised. Also in the preferred embodiment, the dumping position is substantially upside down requiring a rotation of approximately 180°. Optionally, before this rotation, the temperature control means can be commanded to allow the kettle to cool, although this is generally not necessary because it takes longer for the kettle to reheat to the popping temperature for the subsequent popping cycle.

After a time period sufficient to allow the popped corn to empty, the kettle is then rotated back to its substantially upright position ready to begin another popping cycle. In a preferred embodiment, the kettle remains in its dumping position for a time period of between 3–7 seconds before rotating back to its popping position.

The operating steps of a popping cycle, thus, require the actuation and control of three separate mechanical actions: first, the kettle must be rotated between a popping and a dumping position; second, the agitator shaft and kettle lid must be raised and lowered; and third, the agitator mechanism must be activated. These mechanical actions are described next. The control means which command the mechanical actions in response to feedback control signals is described subsequently.

The kettle is rotated by any suitable reversible motor of device capable of applying an angular force to one of the kettle's pivot shafts, and the kettle's position is sensed by any suitable angular position transducer device. The preferred embodiment of these devices is illustrated in FIG. 5. The angular force is supplied by electric motor 555 connected through worm-gear speed reducer 537 to shaft 538, which bears sprocket 540. Pivot shaft 507, supported by journal 530, bears sprocket 541. Sprockets 540 and 541 are connected by chain 542, whereby the angular force of motor 555 is coupled to kettle assembly 509. In a preferred embodiment, sprockets 540 and 541 define an equal speed transfer. Optionally, motion dampers, such as rubber bumpers, can be placed to absorb any play in the rotation coupling components. Alternative mechanical arrangements are apparent to those skilled in the relevant art. In particular, motor 555 and an appropriate gear coupler could be mounted directly on support brace 510 without an intermediate drive. The preferred embodiment illustrated is more attractive as it places these mechanical components out of sight in the upper compartment of the display arrangement.

The kettle angular position transducer devices in the preferred embodiment comprise cam 539 attached to shaft 538 and actuating microswitch 536 and cam 543 attached to shaft 507 and actuating microswitch 535. Cam 543 and microswitch 535 are configured to produce a signal when the kettle has reached its dumping position, this signal being used to halt further rotation towards a dumping position. Cam 539 and microswitch 536 are configured to produce a signal when the kettle has reached its popping position, this latter signal being used to halt further rotation towards an upright position. In the preferred embodiment, both signals result from opening of the respective microswitches. Alternative angular position transducer devices are apparent to those skilled in the relevant arts. For example, an angular encoder attached to shaft 538 can be used in conjunction with conventional discrimination circuitry to produce the two position signals. In addition to these signals, mechanical travel limiting means can be used, such as a metal or rubber stop member, so that the rotation of the kettle can be controlled between the desired angular orientation.

Second, agitator shaft 522 and kettle lid 520 are raised and lowered as one unit, as the kettle lid is supported by retaining ring 523 fixedly attached to the agitator shaft. In the preferred embodiment, the agitator shaft bears teeth, as indicated at 544, which are contacted by gear 545 for causing vertical motion of the shaft. A sufficient portion of the shaft is toothed so that sufficient vertical motion is possible by rotation of gear 545. It is necessary that these teeth do not form a spiral thread, as the agitator shaft must be axially rotated for spinning the agitator mechanism while the shaft remains in one vertical position in contact with coupling hub 304 of FIG. 3C. If these teeth formed a spiral, the agitator shaft would necessarily move out of contact with the coupling hub or be forced into the hub as the agitator is spun. Further, it is preferable that teeth 544 on the agitator shaft be of such a nature as to minimize any play in the vertical positioning of the shaft. For example, acme teeth, which are flat on both sides and the top, have such a play minimizing property.

Figure 7A:
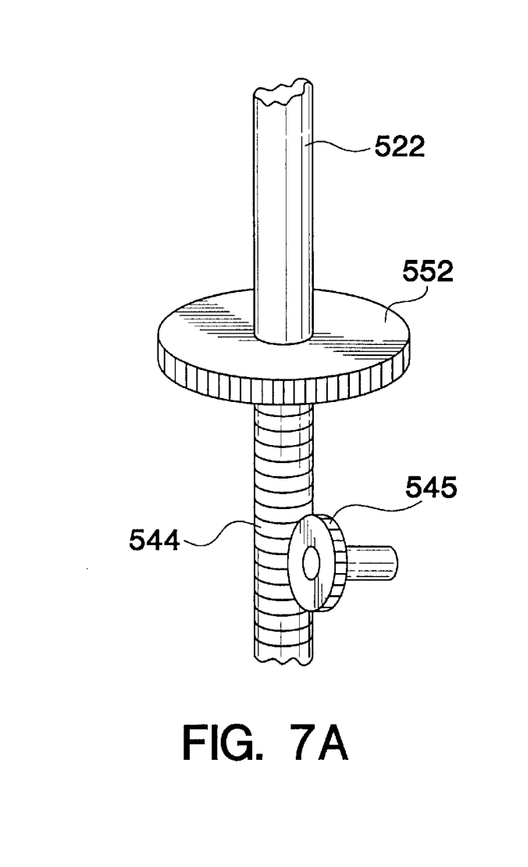
FIGS. 7A and 7B illustrate views of the agitator shaft motion assembly of the support arrangement of FIG. 5.

FIG. 7A illustrates in detail the relation between these elements. There is illustrated shaft 522 with circular, non-spiral threads 544 contacted by gear 545. Preferably shaft 522 has a pitch of 12 ( 12 threads per inch) and gear 545 has a pitch of 20. From this figure it is apparent how shaft 522 can be axially rotated, as by gear 552, while remaining in contact with gear 545 without any tendency for vertical motion consequent to such axial rotation. However, if threads 544 formed a spiral, then such axial rotation would cause shaft 522 to move in a vertical direction.

Alternate means for raising and lowering the agitator shaft are possible. A much less preferred embodiment can employ a threadless rod contacted with a pair of opposed friction wheels that are driven to achieve vertical motion.

The agitator shaft and kettle lid are stabilized for vertical motion by bushings 548 and 549, which may be of either plastic or metal. Bushing 548 is in cross member 501. Bushing 549 passes through member 550 which is supported by a plurality of support rods 551. Gear 545 is driven by a appropriate reversible electric motor and gear reducer unit 547, which are partially hidden by their support bracket 546. Alternate arrangement for stabilizing the agitator shaft for vertical motion and for driving gear 545 are apparent to those skilled in the relevant art and are encompassed within this invention even though no further mention needs to be made here.

Control of vertical position requires measuring the vertical position of the kettle lid and agitator shaft unit. Any position transducer known in the art capable of operating over the extended range necessary can be employed. In the preferred embodiment, only three vertical positions are signaled: a down position in which the lid is in contact with the kettle and the agitator shaft is in contact with coupling hub 304 of FIG. 3C; an up position in which the shaft and lid are sufficiently elevated to permit rotation of the kettle assembly; and an intermediate position of the lid which indicates substantially complete popping of the popcorn provisioned into the kettle and wherein the shaft remains in contact with the coupling hub. These positions are signaled by microswitches 532, 533, and 534 fixedly attached at appropriate positions along side brace 510. These switches are contacted by the kettle lid in order to generate the preferred position signals.

The up position signal is used to halt further raising of the agitator shaft and kettle lid, and to signal that the kettle assembly may be rotated to a dumping position. The down position signal is used to halt further lowering of the shaft and lid, and to signal that oil may be provisioned into the kettle. Finally, the intermediate position signal is used to initiate the step of the popping cycle wherein the shaft and the lid are raised and the popped corn is dumped from the kettle assembly.

All microswitches used in this invention, 532, 533, 534, 535, and 536, can be conventional microswitches adapted to withstand the temperatures generated near the kettle assembly.

Finally, agitator shaft 522 in the down position and in contact with coupling hub 304 is rotated to activate the agitator assembly. When the shaft is down, gear 552, which is fixedly connected to the shaft, contacts gear 553, which is attached to motor and gear unit 554 to rotate or spin shaft 552. Since threads 544 do not form a spiral, shaft 522 remains in position as it is spun.

Figure 7B:
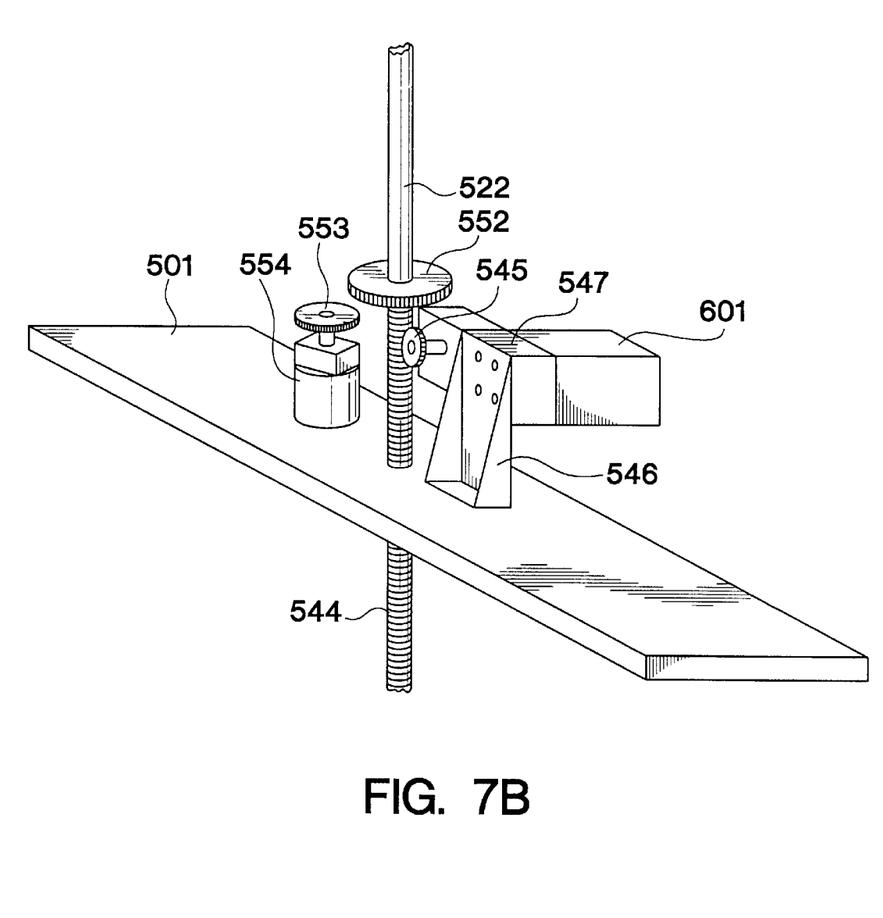

FIG. 7B illustrates detail of shaft 522 in the down position. Gear 545 has rotated until the down position is signaled by microswitch 534, and consequently it is near the top of threaded portion 544 of shaft 522. Gear 545 has been driven by reversible electric motor 601 and gear reducer 545. In the down position, the bottom of shaft 522 bearing pin 410 of FIG. 4A in contact with coupling hub 304 of FIG. 3C and the gears 552 and 553 mesh. Thereby, when gear 553 is driven by motor and gear unit 554, rod 552 rotates axially, which drives the agitator mechanism.

Figure 6:
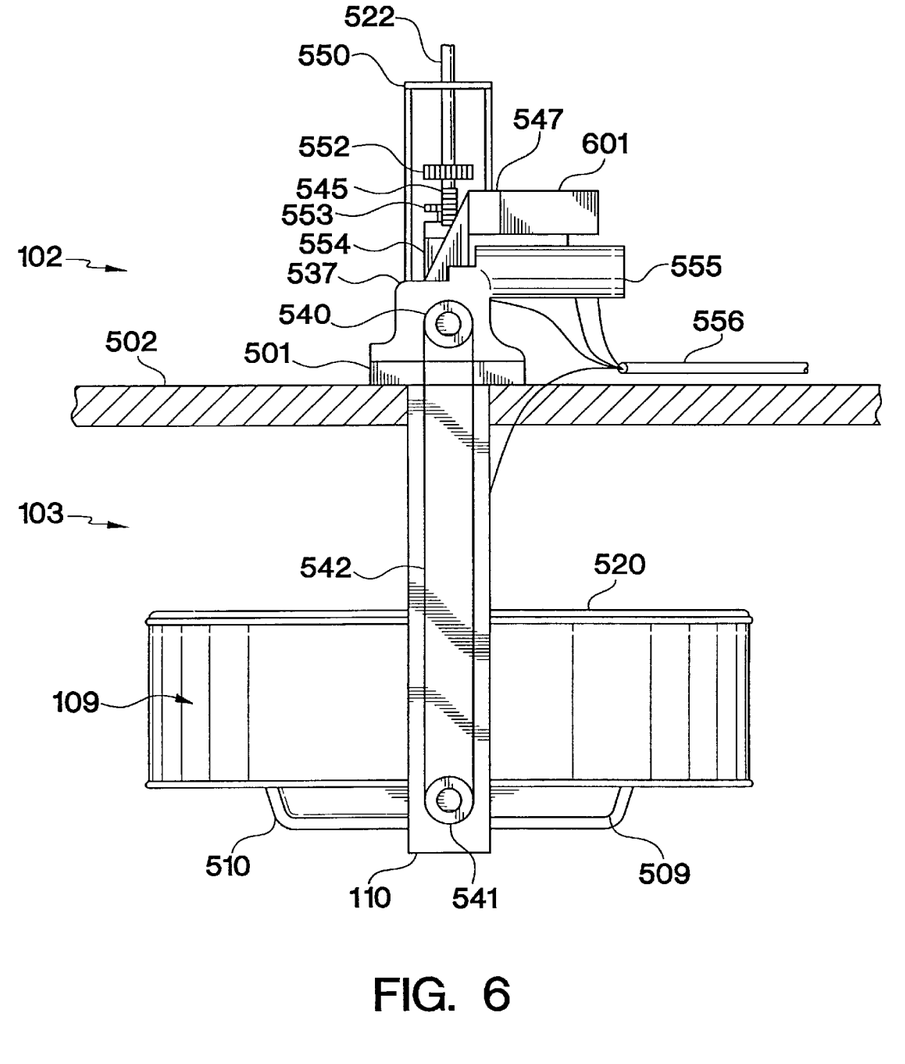
FIG. 6 illustrates a side view of the support arrangement of FIG. 5.

FIG. 6 illustrates a side view, with respect to the orientation illustrated in FIG. 1, of the support arrangement of this invention. The visible physical structure includes vertical brace member 542, cross member 501, and horizontal support members 502. Member 502 and all elements above are positioned in the upper compartment of the display arrangement. All elements below horizontal member 502 are positioned in the display compartment. Kettle assembly 509 with lid 520 is supported on legs 509 and 510 and is rotated by the chain drive comprising sprockets 540 and 541 and chain 542. Kettle rotating motor 555 and worm gear drive 537 rotate the kettle. Shaft raising motor 601 and gear unit 547 drive gear 545 for raising and lowering agitator shaft 522 and kettle lid 520. Agitator motor 554 axially rotates shaft 522 through gear 532. Arrangement 550 stabilizes shaft 522 for vertical motion.

Signal wires from the position sensing microswitches and power wires to the actuator motors are gathered into wiring harness 556 on their route to the control compartment 233 of FIG. 2.

D. THE CONTROL MEANS

The control means of this invention include means for kettle assembly temperature control, means for mechanical motion control, and means for automatically sequencing the steps of a popcorn popping cycle. The control means are contained in compartment 233 of FIG. 4.

Figure 8A:
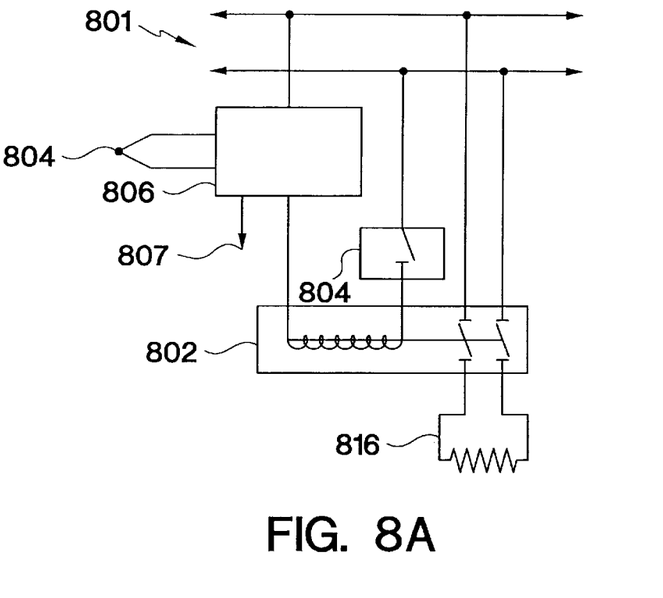
FIGS. 8A, 8B, 8C illustrate the control means and control sequencing of this invention.
Figure 8B:
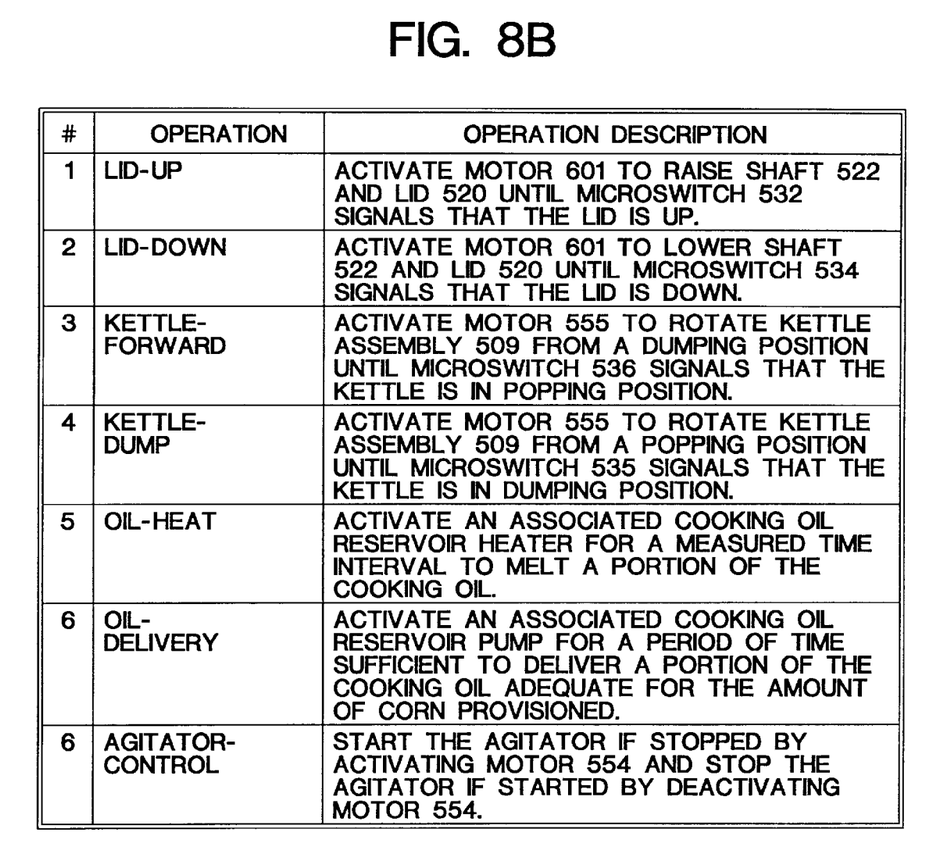

FIG. 8A illustrates a preferred embodiment of the temperature control means. Kettle heating element or elements 316 are attached to the underside of the popping kettle as in FIG. 3C. These may be sized from 4 to 10 KW depending of kettle size and popping throughput required. Heating elements 316 are powered from power mains 801 through relay 802. This relay is preferably adapted to repetitive high current applications and in the preferred embodiment is a mercury relay or an electronic relay. One leg of the control circuit for relay 802 includes normally-on thermal switch 804, which is one of temperature sensing means 317 in FIG. 3C. This switch is set to open at the maximum safe kettle temperature in order to prevent such a temperature from being exceeded. In the preferred embodiment the maximum kettle temperature is 475° F. The other leg of the relay control includes thermocouple temperature control 806 with thermocouple 804, which is also one of temperature sensing means 317 in FIG. 3C. Temperature control 806 provides an adjustable temperature control for setting a desired popping temperature and optionally displaying the current kettle temperature. An exemplary popping temperature is between about 415 and 430° F. The temperature control can optionally also include outputs 807 for indicating to other control means when the kettle is at a desired popping or dumping temperature. Advantageously, the temperature controller can be locked out so as to prevent someone from tampering with or changing the set point of popping temperature in the field. The preferred temperature controller is a Model 1603 from Chromalox (Lavergne, Tenn.), although any other equivalent controller may be used. Acting together with the preferred cast aluminum kettle, these elements maintain a safe, adjustable temperature constant to within +3° F. throughout the interior of the kettle.

Turning now to the means for mechanical motion control, control of the motor actuators by the position and angular feedback signals are grouped into a plurality of elementary operations that can be separately requested. This control is accomplished by a programmed logic controller ("PLC") such as is known in the art. The feedback microswitch signals are input to the controller which in turn outputs power to the motors, perhaps through relays or solid state switches if required. The preferred PLC is Model C40K-CDRA from the Omron Corp, although any other equivalent PLC may be used.

FIG. 8B lists these elementary operations and indicates how the PLC actuates the motors and responds to the feedback signals. For example, when the KETTLE-DUMP operation is requested, the PLC actuates kettle rotation motor 555 via relays or contactors in such a direction so that it causes the kettle assembly to rotate from a popping position in a clockwise direction in the view of FIG. 6 until microswitch 535 actuated by cam 543 on shaft 507 generates a signal. This signal indicated that the kettle assembly has reached a dumping position, which is a substantially upside down position. Requesting the KETTLE-FORWARD, by contrast, causes the PLC to activate motor 555, via relays or contactors, in a reverse direction until microswitch 536 activated by cam 539 on shaft 538 generates a signal, which signal indicates that kettle assembly has reached a substantially upright popping position.

A further function of the PLC is to automatically sequence these elementary operations in order to fully automatically execute a corn popping cycle. For automatic execution, an operator would provision the proper amount of corn and then request an automatic cycle. No further intervention in the operation of the machine is necessary.

Figure 8C:
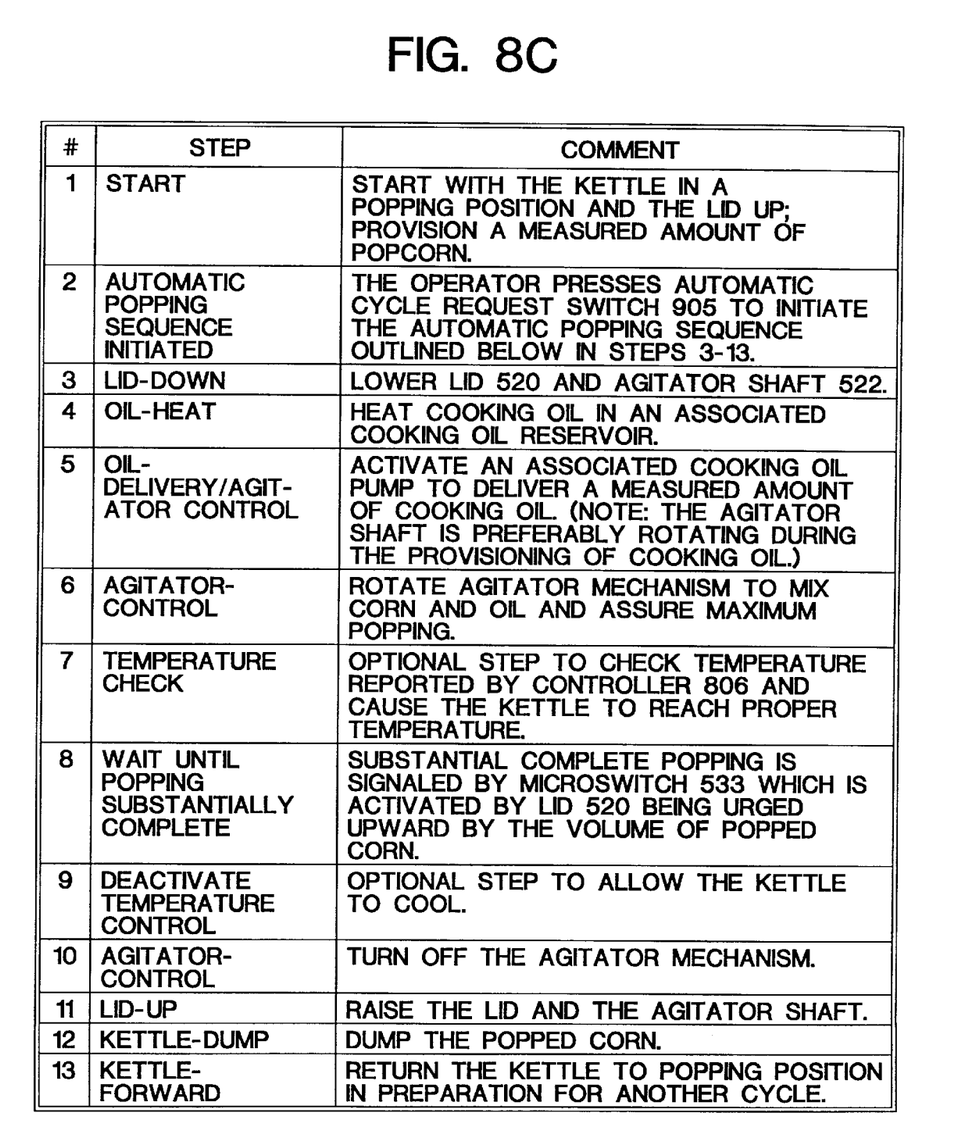

FIG. 8C illustrates a timing sequence for manual corn provision followed by an automatic popping cycle. If the optional temperature checking step were omitted from the sequence of FIG. 8C, the operator would also have to manually check and adjust the kettle temperature.

In the case of manual sequencing, an operator would have to manually request each of the eleven operations listed in the order listed. This may be used for certain situations when high production automatic operation is not necessary.

This invention is adaptable to alternative control means of equivalent function. In particular, a simple microprocessor with associated interfacing circuity is more than adequate to fully control all elements of this apparatus.

Figure 9:
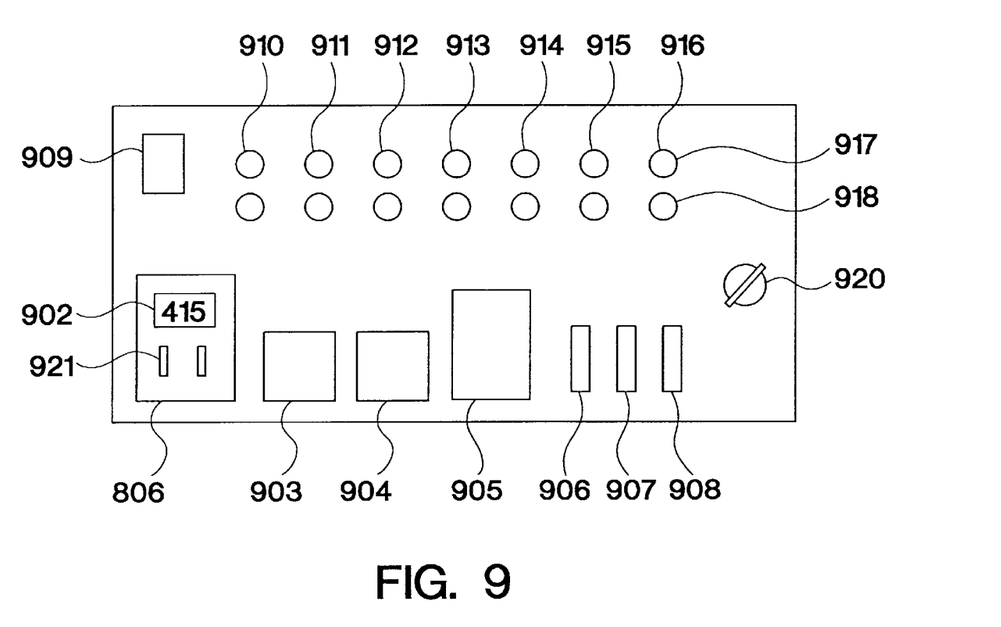
FIG. 9 illustrates a face view of an exemplary control panel for the apparatus of FIG. 1.

FIG. 9 illustrates control panel 106 by which an operator of this invention interacts with the control means of this invention to request the operations previously described and receive status on the operation of the corn popping apparatus of this invention. Switch and light 903 is the master power on/off. Row 917 is a row of indicator lights, and row 918 is a row of push buttons. Each of the seven pairs of one button and one light—910, 911, 912, 913, 914, 915, and 916—correspond to one of the elementary operations illustrated in FIG. 8B. The button requests the corresponding elementary operation and the light glows to indicate the operation is in progress. During automated operation, each light is lit in sequence as the steps are conducted. When manual operation is conducted, the lights are lit as the button is manually pushed and operation begins.

Key switch 920 has two positions: a manual position and an automatic position. In the manual position, manual indicator light 909 is illuminated, and request buttons 918 are activated for manual control of the individual elementary operations of the corn popper. In the automatic position, automatic indicator light 904 is illuminated, and request buttons are not active to request elementary operations. Request lights 917 remain active for monitoring the progress of a popping cycle. However, automatic cycle request switch and light 905 is activated. Steps 3–13 of FIG. 8C illustrate a timing sequence for the automatic cycle commenced by depressing the automatic cycle request switch and light 905.

During the cycle this light is illuminated, and individual lights 917 are illuminated according to the cycle step being performed. To stop the automatic sequence during the cycle the key switch may be turned to the manual position which in turn resets the machine.

Further controls include temperature controller 806, which in turn includes a display for the current kettle temperature 902 and means 921 for temperature adjustment and kettle heating control. The temperature controller can be either automatically controlled from the PLC or manually controlled by an operator. Switches 906, 907, and 908 control associated devices, such as display compartment lighting and warming the contained popped popcorn.

In this manner, an operator of this invention is able to fully control the operation of the invention in either an automatic or manual manner and to monitor the progress of corn popping. The key switch provides added security in that in can be used to prevent unskilled operators for operating the invention in a perhaps dangerous or destructive fashion.

Alternative arrangements of lights and switches can be adapted to this invention. In particular all indicators could be displayed on an LCD screen, and all input could be provided through a keypad.

E. SPECIFIC EMBODIMENTS, CITATION OF REFERENCES

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are incorporated by reference in their entireties.

What is claimed is:

1. A method of popping corn comprising the steps of:
   provisioning corn kernels into a kettle assembly that is in a popping position; and
   commencing an automatic popping sequence comprising the steps of:
   lowering a lid onto the kettle assembly, said lid being operatively associated with an agitator shaft;
   delivering cooking oil into the kettle assembly through the agitator shaft and out of at least one aperture in the agitator shaft;
   rotating the agitator shaft to mix the corn kernels with the cooking oil;
   popping the corn kernels while the agitator shaft is rotated;
   raising the lid of the kettle assembly by raising the agitator shaft after corn kernels have popped;
   dumping the popped corn from the kettle assembly in a dumping position; and
   returning the kettle assembly to the popping position.

2. The method of claim 1, further comprising the step of sensing that the kettle assembly is in the popping position and that the lid is in contact with the kettle assembly before delivering the cooking oil therein.

3. The method of claim 1, further comprising the step of sensing that the lid is sufficiently raised to allow movement of the kettle assembly to the dumping position before dumping the popped corn.

4. The method of claim 1, further comprising the step of providing sufficient time for the corn to fully pop before raising the lid and dumping the popped corn.

5. The method of claim 1, further comprising the step of providing sufficient time for the corn to fully dump before returning the kettle assembly to the popping position.

6. The method of claim 1 which further comprises rotating the kettle assembly to the dumping position after raising the lid and agitator shaft.

7. The method of claim 1, wherein the agitator shaft is rotatable and defines a passageway therein with an opening associated at a first end of the passageway and the aperture at the second end of the passageway, the kettle assembly includes a kettle for popping corn therein, and the method further comprises rotating the agitator shaft to agitate the corn kernels and cooking oil, and introducing the cooking oil into the kettle by directing it into the passageway opening of the shaft, through the passageway and then out of the aperture into the kettle.

8. The method of claim 7, which further comprises fluidly connecting a conduit between a source of cooking oil and the passageway opening of the agitator shaft for introducing the cooking oil into the kettle through the passageway.

9. The method of claim 8, which further comprises providing the conduit with a swivel attachment in order to allow rotation of the agitator shaft as the cooking oil enters the kettle.

10. The method of claim 8, which further comprises pumping the cooking oil from the source with sufficient pressure to spray the oil into the kettle through the aperture of the agitator shaft.

11. The method of claim 7, which further comprises configuring the aperture at the second end of the passageway with a diameter that is smaller than that of unpopped corn kernels so that the unpopped corn kernels do not become lodged in the aperture.

12. A method of popping corn comprising the steps of:
    provisioning corn kernels into a kettle that is in a popping position; and
    commencing an automatic popping sequence comprising the steps of:
    lowering a lid onto the kettle, said lid being operatively associated with an agitator;
    delivering cooking oil into the kettle through the agitator;
    rotating the agitator to mix the corn kernels and cooking oil;
    popping the corn kernels while rotating the agitator;
    raising the lid of the kettle and agitator after corn kernels have popped;
    dumping the popped corn from the kettle in a dumping position; and
    returning the kettle to the popping position.

13. The method of claim 12, which further comprises the step of sensing that the kettle is in the popping position and that the lid is in contact with the kettle before delivering the cooking oil therein.

14. The method of claim 12, which further comprises the step of sensing that the lid is sufficiently raised to allow movement of the kettle to the dumping position before dumping the popped corn.

15. The method of claim 12, which further comprises the step of providing sufficient time for the corn to fully pop before raising the lid and dumping the popped corn.

16. The method of claim 12, which further comprises the step of providing sufficient time for the corn to fully dump before returning the kettle to the popping position.

17. The method of claim 12, wherein the agitator includes an agitator shaft and the cooking oil is delivered into the kettle through the agitator shaft.

* * * * *